United States Patent [19]

Masuno et al.

[11] Patent Number: 5,696,919
[45] Date of Patent: Dec. 9, 1997

[54] ACCESSING A DESK-TYPE RECORDING MEDIUM HAVING REPRODUCTION CONTROL DATA

[75] Inventors: Takashi Masuno, Katano; Takatoshi Nada, Tsuzuki-gun; Wataru Masuno, Kadoma; Tatsuya Murata, Higashiosaka; Hideaki Ogawa, Kyoto; Tatsuya Nishimura, Kakogawa; Keiichi Kameda, Kyoto, all of Japan

[73] Assignee: Matsushita Electric Industrial Co., Ltd., Osaka, Japan

[21] Appl. No.: 389,332

[22] Filed: Feb. 14, 1995

[30] Foreign Application Priority Data

Feb. 14, 1994 [JP] Japan .................... 6-017163

[51] Int. Cl.$^6$ ................... G06F 3/14; G11B 27/19
[52] U.S. Cl. ................... 395/354; 395/970; 369/33; 369/30
[58] Field of Search ..................... 395/156, 161, 395/159, 154, 354, 328, 970, 352, 353, 349; 369/32, 33, 30, 34

[56] References Cited

U.S. PATENT DOCUMENTS

| 4,237,497 | 12/1980 | Trevithick | 369/33 X |
| 4,766,581 | 8/1988 | Korn et al. | 369/30 |
| 4,779,080 | 10/1988 | Coughlin et al. | 395/156 X |
| 5,216,644 | 6/1993 | Shiba et al. | 369/32 |
| 5,408,448 | 4/1995 | Carman | 369/32 |
| 5,408,449 | 4/1995 | Oh | 369/32 |
| 5,515,347 | 5/1996 | Mulder et al. | 369/30 |

FOREIGN PATENT DOCUMENTS

| 0322037 | 6/1989 | European Pat. Off. . |
| 0418040 | 3/1991 | European Pat. Off. . |
| 0569244 | 11/1993 | European Pat. Off. . |
| 0582057 | 2/1994 | European Pat. Off. . |

*Primary Examiner*—Raymond J. Bayerl
*Attorney, Agent, or Firm*—McDermott, Will & Emery

[57] ABSTRACT

A method of controlling the selections on a reproducible control data structure with two different selection control methods. According to a first control method, single frame plural selectors, to each of which a numerical identifier has been added, are displayed. Branch tables grouping branch data according to selector numbers are provided. A user makes a selection by selecting a selector number. According to a second control method, plural sectors are displayed in a single frame. A user-specified selector and other selectors are provided for visually differentiating between the selectors as a means of prompting user confirmation of the specified selector. A selection confirmed by the user controls the selection by means of the branch data. Branch data usable by both the first control method and the second control method is grouped together by providing the branch data used by the second control method in the branch table used by the first control method.

4 Claims, 8 Drawing Sheets

ACCESSING A DESK-TYPE RECORDING MEDIUM HAVING REPRODUCTION CONTROL DATA

BACKGROUND OF THE INVENTION

1. Field of the Invention

The present invention relates to the selection control method of a recording medium reproduction apparatus.

2. Description of the Prior Art

Typical conventional reproduction control methods require reproduction control data identifying, for example, the reproduction procedure and addressing information to be recorded to the recording medium. The limitations imposed by such pre-recorded control data have driven demand for an operating environment with greater ease of use.

The selection control method of the prior art is described below with reference to a disk-type recording medium and reproduction apparatus.

FIG. 3 is a block diagram of a disk reproduction apparatus using this selection control method of the prior art. FIG. 7 is a flow chart of the selection control method according to a first example of the prior art. FIG. 10 is a flow chart of the selection control method according to a second example of the prior art. FIG. 6 is an example of a selection menu used in the first example of the prior art. FIG. 9 is an example of a selection menu used in the second example of the prior art.

The operation of the first example of the prior art is described below with reference to FIGS. 3, 6, and 7.

In step 1, a controller 31 reads reproduction control data previously recorded to a disk 33 using a disk reproduction means 32, and stores the reproduction control data. This reproduction control data comprises address information of a location on the disk 33 at which a menu frame used to display selection branches is stored; and a branch table containing numeric identifiers for respective selection branches, and numbers of tracks from which respective selection branches have been recorded. An example of this reproduction control data structure is shown in FIG. 5.

In step 2, the controller 31 references the stored reproduction control data to provide the address information of the menu frame to the disk reproduction means 32, and thereby reproduce the menu frame (FIG. 6) to display it on a reproduction display means 35.

In step 3, the controller 31 receives a key value n from a key input means 34 to identify a desired selection branch.

In step 4, the controller 31 references the stored reproduction control data to determine whether identifier n is defined. If the identifier n is undefined, the procedure loops back to step 2.

In step 5, the controller 31 again references the stored reproduction control data to obtain a track number p corresponding to identifier n.

At step 6, the controller 31 reproduces track p from the disk 33 using the disk reproduction means 32, and loops back to step 2 when track p reproduction is completed.

It is thereby possible for the selection control method of this first example of the prior art to reproduce the track corresponding to the value assigned to a given data input key.

Next, the operation of the second example of the prior art is described below with reference to FIGS. 3, 9, and 10.

In step 1, the controller 31 reads the reproduction control data previously recorded on the disk 33 by means of disk reproduction means 32, and stores the reproduced data. This reproduction control data comprises a plurality of branch tables, each branch table containing address information of a location on the disk at which a menu frame has been recorded beforehand, track number information of numeric identifiers for respective selection branches displayed on a menu, and offset information for linking other branch tables. An example of this reproduction control data structure is shown in FIG. 8.

In step 2, the controller 31 references the stored reproduction control data to provide the address information of the menu frame for the first branch table to the disk reproduction means 32, and thereby reproduce the menu frame 1 (FIG. 9, menu m1) stored on the disk 33 to display it on the reproduction display means 35.

In step 3, the controller 31 receives a key value n from the key input means 34.

In step 4, the controller 31 determines whether the value n is the PLAY key and thereby signifies selection confirmation, or is the NEXT key signifying selection rejection. If n is the NEXT key, the procedure jumps to step 7.

If the selection branch identified is confirmed in step 4, the controller 31 references the stored reproduction control data to obtain the corresponding track number p in step 5.

In step 6, the controller 31 reproduces the selected track p from the disk 33 by means of the disk reproduction means 32, and loops back to step 2 when track p reproduction is completed.

In step 7, the controller 31 uses information of a next branch table contained in the reproduction control data to display a next selection branch and, thereafter, the procedure loops back to step 2.

It is thereby possible for the selection control method of this second example of the prior art to reproduce the corresponding track when the selection branch displayed in the menu is confirmed by the user, and to display a succession of dependent menus providing alternative selection branch candidates when the selection branch is rejected.

The problem with the two selection control methods of the prior art as described above is that the reproduction control data of the two methods is not mutually compatible, and the structure of the reproduction control data is fixed when the selection control method to be used for disk control is determined. In other words, it is not possible to change the selection control method as a result of changes in specifications during the disk production process, and it is not possible to produce disks in which both selection control methods are used.

SUMMARY OF THE INVENTION

Therefore, an object of the present invention is to provide a selection control method comprising a reproduction control data construction compatible with two different selection control methods.

To achieve the above object, a selection control method according to the present invention uses both a first control method and a second control method, said first control method displaying in a single frame plural selection branches to each of which has been allocated a numerical identifier, and controlling operation by means of branch tables grouping branch data according to the selection numbers, which are selected by the user; and said second control method visually differentiating the user-specified selection branch and the other selection branches as a means of prompting user confirmation of the specified selection branch when the plural selection branches are displayed in a single frame, and controlling operation by means of the branch data of the confirmed selection when the user confirms the prompt; and is characterized by grouping the branch data usable by both the first control method and the second control method by providing the branch data used by the second control method in the branch table used by the first control method.

By means of the branch data construction thus described, all branch data required by the first and second control methods is contained within the branch data construction.

BRIEF DESCRIPTION OF THE DRAWINGS

The present invention will become more fully understood from the detailed description given below and the accompanying drawings wherein.

DESCRIPTION OF PREFERRED EMBODIMENTS

The preferred embodiment of a selection control method according to the present invention is described below with reference to the accompanying drawings.

Figure 1A:
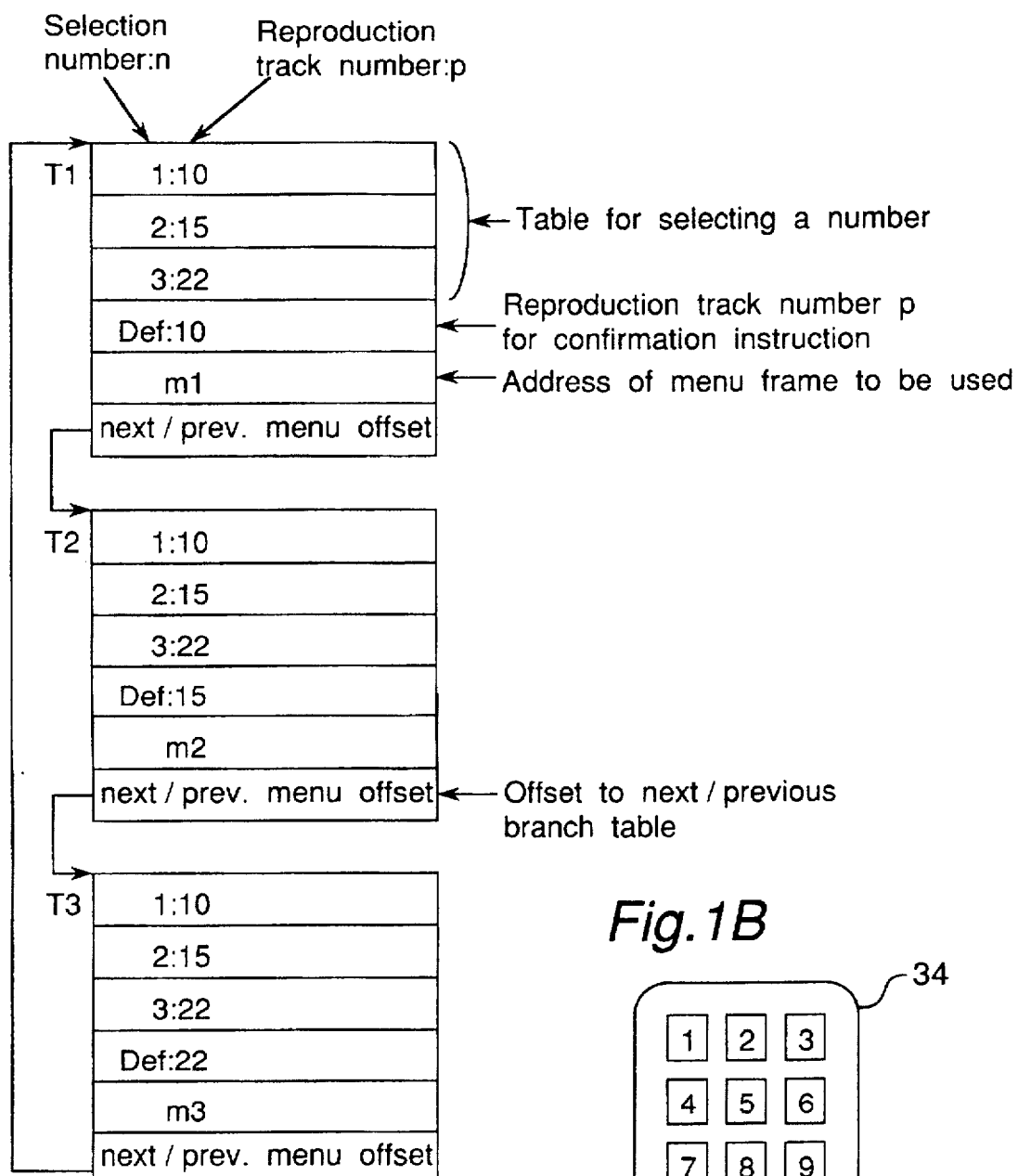
FIG. 1A is a diagram showing the reproduction control data structure according to a preferred embodiment of the present invention.
Figure 1B:
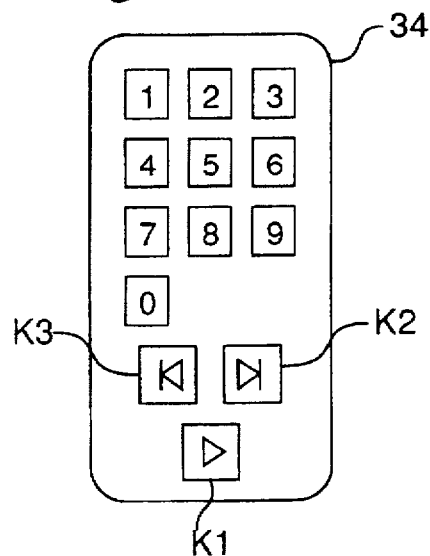
FIG. 1B is a diagram showing a remote controller.
Figure 2A:
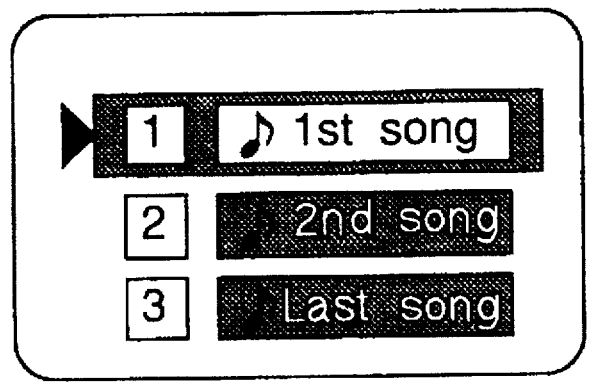
FIGS. 2A, 2B and 2C are plan view of screens showing the menu frames used for the present invention.
Figure 2B:
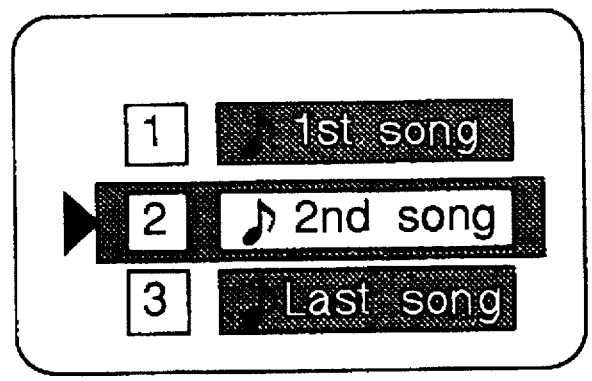
Figure 2C:
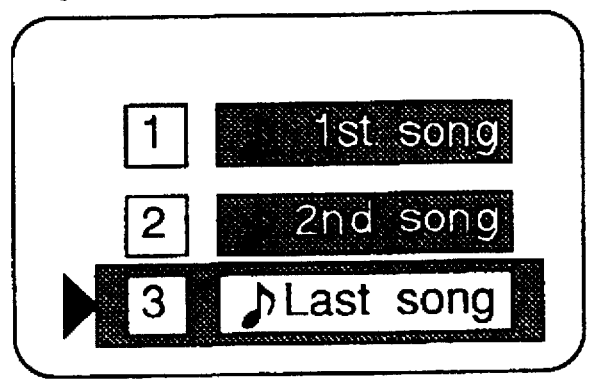
Figure 4:
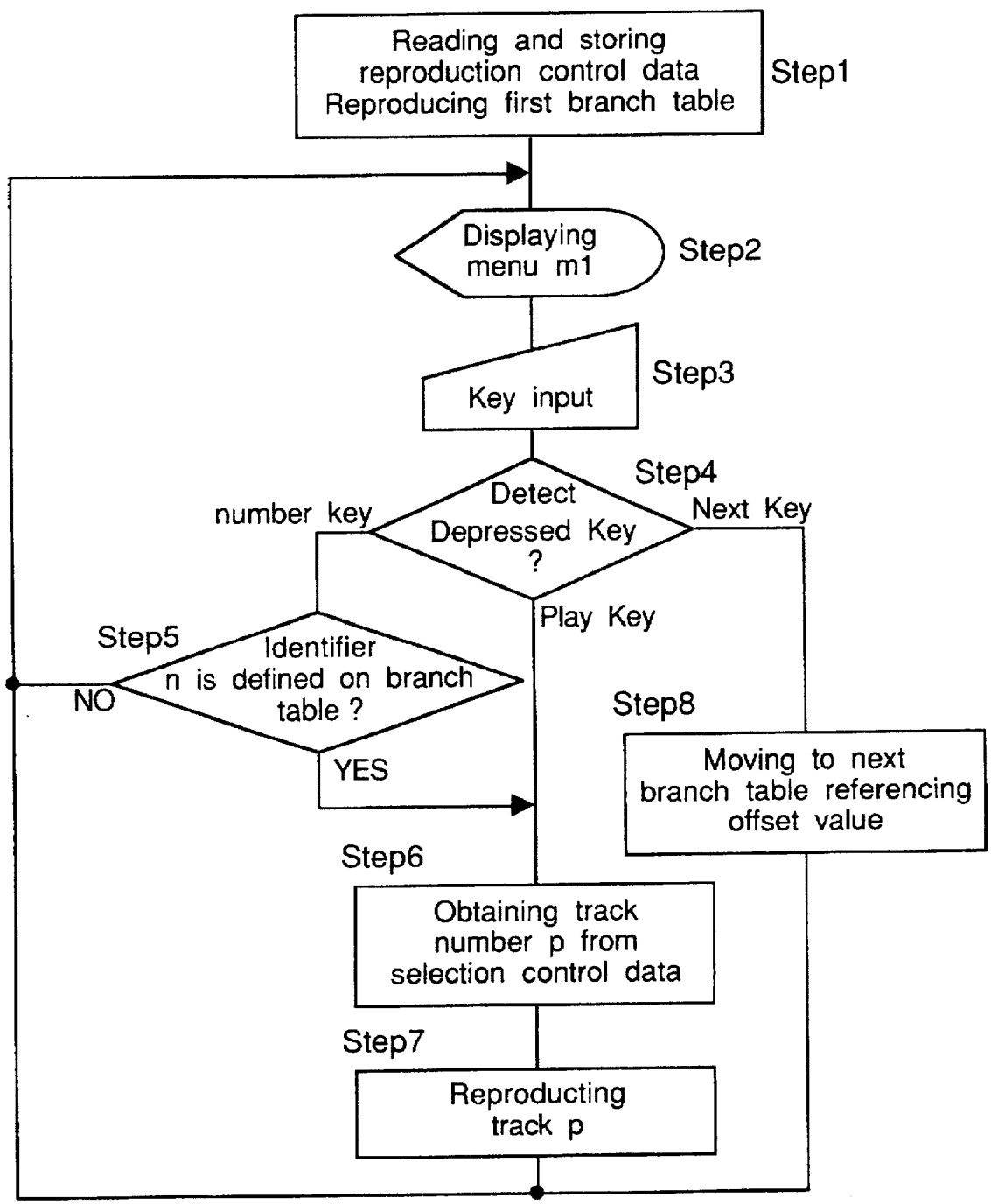
FIG. 4 is a flow chart of the selection control method according to the present invention.
Figure 5:
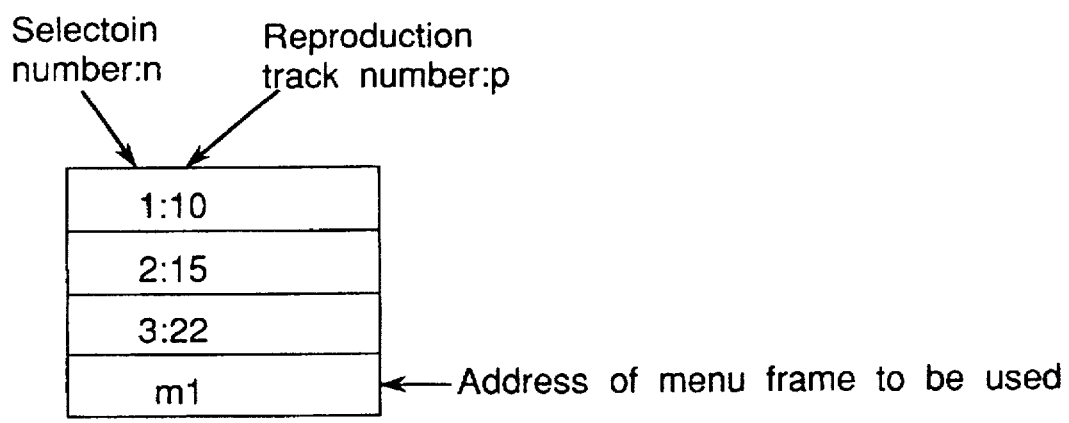
FIG. 5 is a first example of the reproduction control data construct of the prior art.
Figure 6:
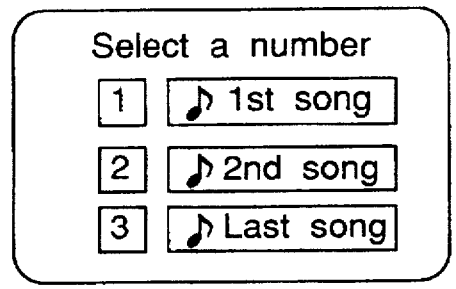
FIG. 6 is an example of a selection menu used in the first example of the prior art.
Figure 7:
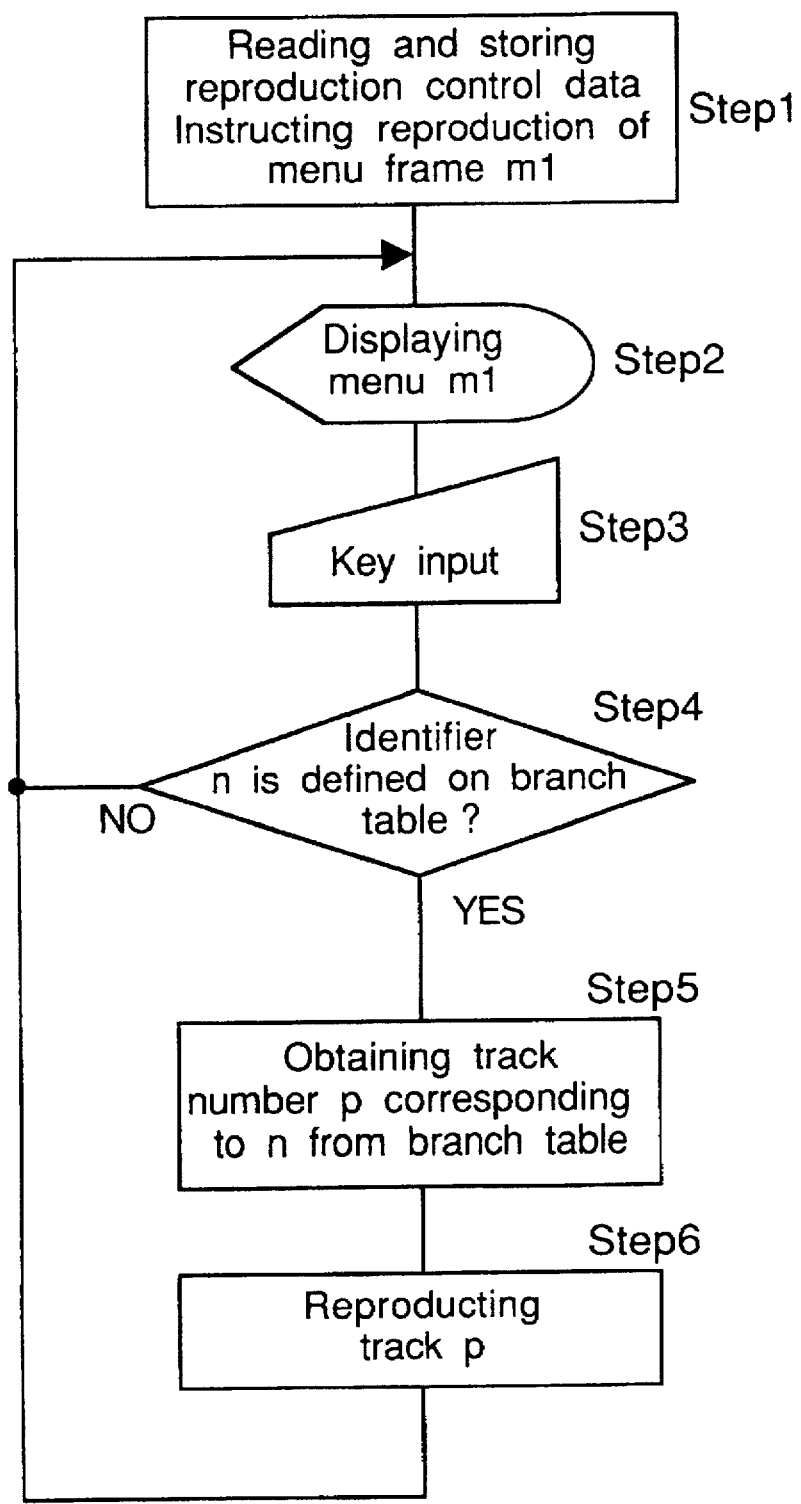
FIG. 7 is a flow chart of the selection control method according to first example of the prior art.
Figure 8:
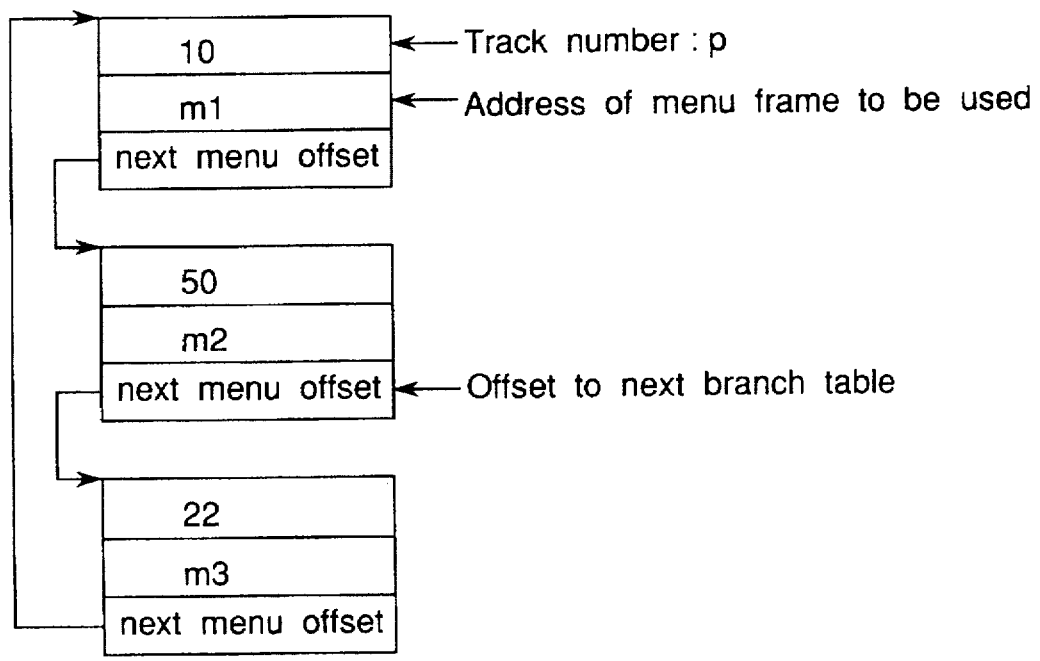
FIG. 8 is a second example of the reproduction control data construct of the prior art.
Figure 9:
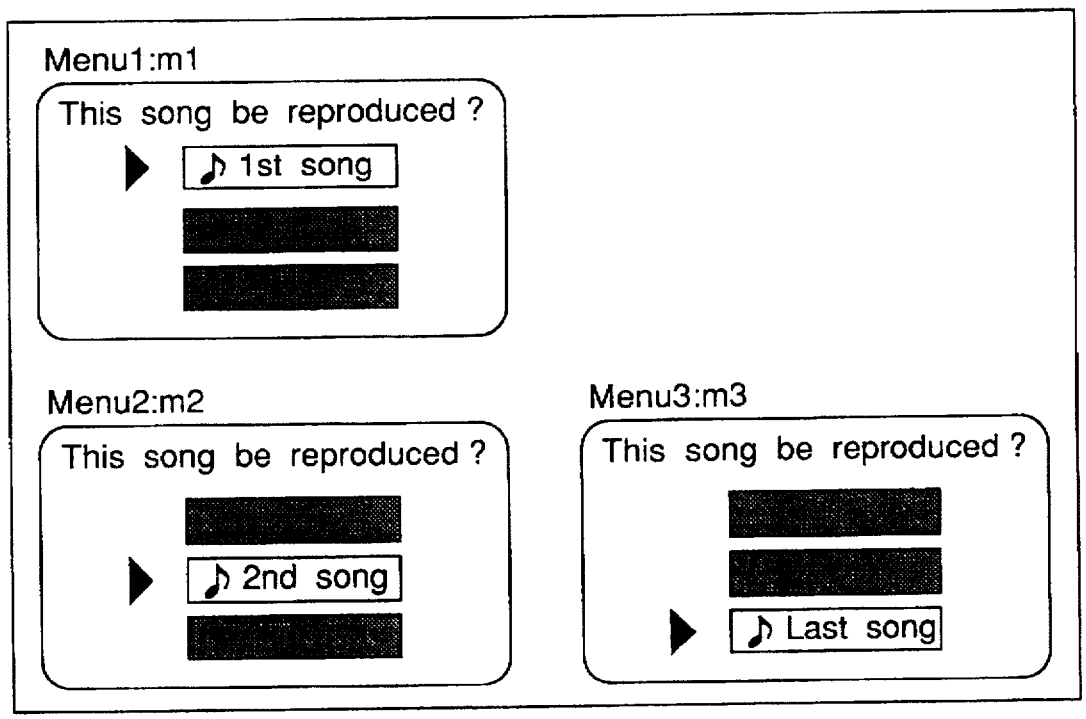
FIG. 9 is an example of a selection menu used in the second example of the prior art.
Figure 10:
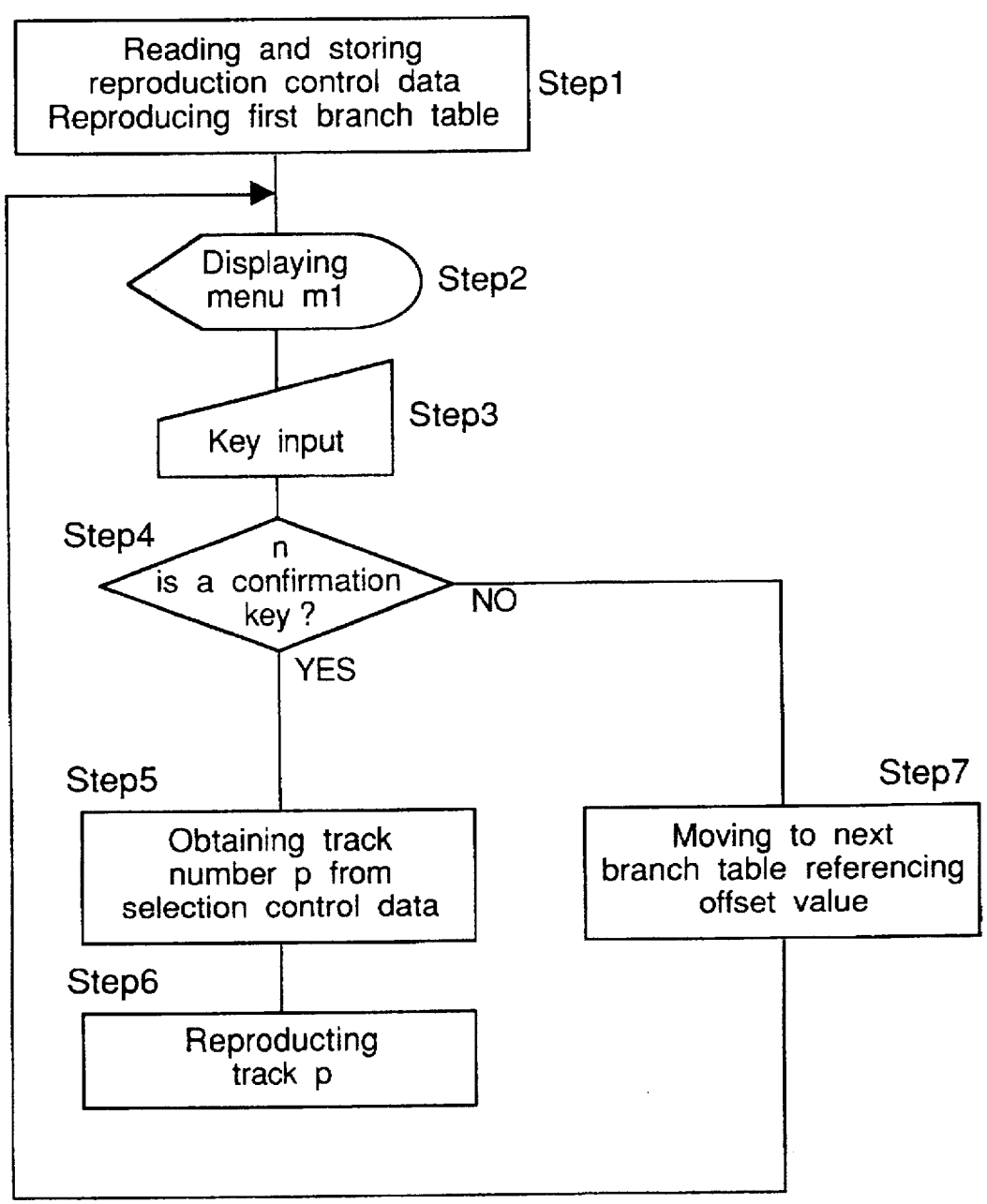
FIG. 10 is a flow chart of the selection control method according to second example of the prior art.

FIG. 1A is a diagram of the reproduction control data according to the preferred embodiment of the present invention, FIGS. 2A, 2B and 2C are examples of the menu frames shown on a screen, such as a TV screen, used by the present invention, and FIG. 4 is a flow chart of the selection control method of the present invention.

Figure 3:
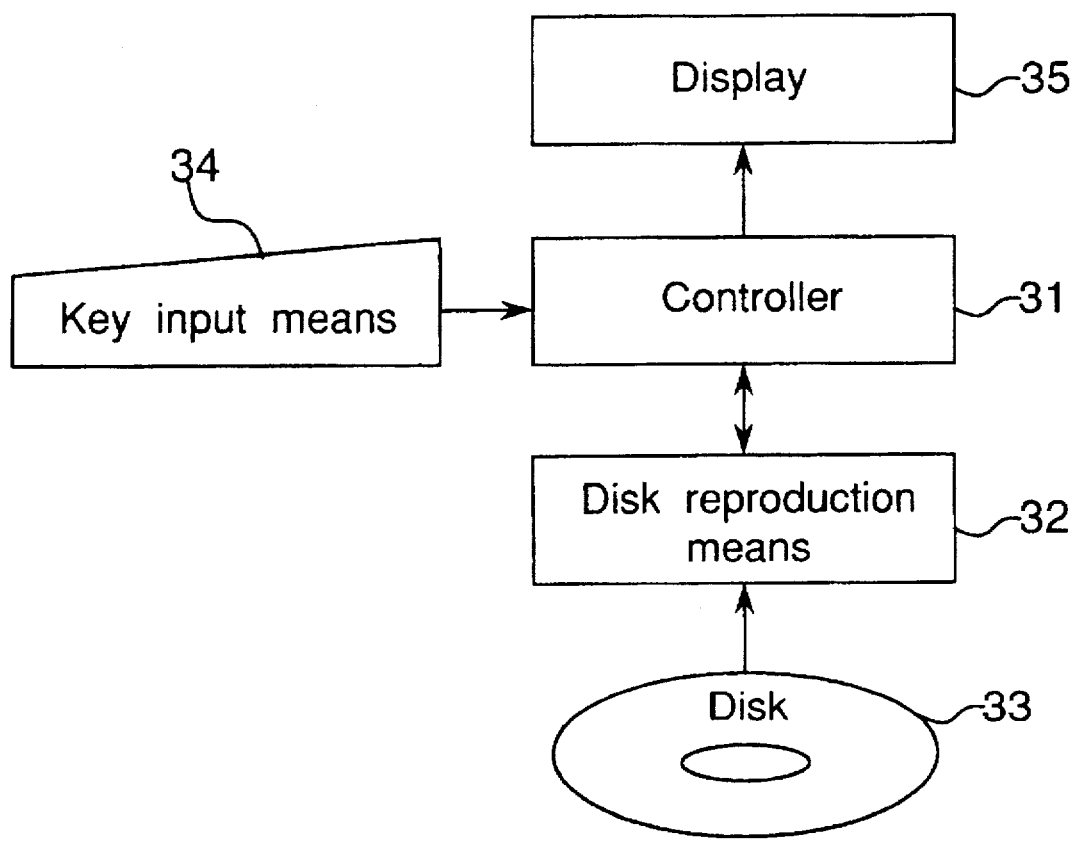
FIG. 3 is a block diagram of a disk reproduction apparatus which is applicable to not only the prior art but also the present invention.

The selection control method of the present invention is described hereinbelow with reference to a reproduction apparatus for a disk-type recording medium, such as an optical disk or an magneto-optic disk. The configuration of this apparatus is identical to that of the prior art and shown in FIG. 3, and further description thereof is omitted below. The operation of the present invention is described below with reference to FIGS. 1A, 1B, 2A, 2B, 2C, 3, and 4.

Reproduction control data are previously stored in a predetermined area in a disk and comprises a plurality of branch tables. Each of these tables comprises: address information of a location on the disk at which a menu frame for displaying a selection branch is stored; a correspondence table of identification numbers for each of selection branches to be used in the first selection control method and corresponding track number information; track number information on the disk corresponding to only one selection branch displayed on a menu frame employed in the second selection control method; and an offset value defining a linkage between one branch table and the next branch table. An example of the branch table construction according to the present invention is shown in FIG. 1A.

In FIG. 1A, three tables T1, T2 and T3 are shown. The first table T1 includes: in the first three rows three track number data 10, 15, 22 corresponding to selection numbers 1, 2 and 3, respectively; in the fourth row a default data, such as a track number data 10 which is the same as that in the first selection number 1; in the fifth row an address m1 in the disk where the first menu frame is stored; and in the sixth row command data for erasing (closing) the present table and reading (opening) the next or previous table. The address m1 is given, for example, by mm:ss:cc in which mm represent minutes, ss represents seconds and cc represents sectors. As apparent to those skilled in the art, there are 74 sectors in one seconds.

The second table T2 includes: in the first three rows and the last row, the same data as those in the first table; in the fourth row a default data, such as a track number data 15 which is the same as that in the second selection number 2; and in the fifth row an address m2 in the disk where the second menu frame is stored.

The third table T3 includes: in the first three rows and the last row, the same data as those in the first table; in the fourth row, a default data, such as a track number data 22 which is the same as that in the third selection number 3; in the fifth row an address m3 in the disk where the third menu frame is stored.

These tables T1, T2 and T3 are stored at predetermined area in the disk and read out by a disk player, in response to a trigger signal, in a known manner. The trigger signals may be produced from key input means, such as a remote controller 34 shown in FIG. 1B, which has ten keys, play key K1, fast forward key K2 and fast reverse key K3. The ten keys are used to trigger the corresponding selection numbers. The play key K1 serving as an enter key is used to trigger the default data. The fast forward key K2 serving as a next selection key is used to trigger the next menu offset, and the fast reverse key K3 serving as a previous selection key is used to trigger the previous menu offset.

When the power is on, the first table T1 is opened as an initial stage. When the first table T1 is opened, address m1 is accessed to read data for the first menu which is stored in the disk at address m1 so that the screen will show a menu as shown in FIG. 2A. As shown in FIG. 2A, in the displayed menu, the first section number 1, corresponding to the default data, is high-lighted. From this state, when the fast forward key K2 on the remote controller RC is depressed, the command data at the sixth row is effected to close the first table T1 and open the second table T2. In this manner, in response to each depression of the fast forward key K2, the table is sequentially changed in the forward direction. Similarly, in response to each depression of the fast reverse key K3, the command data at the sixth row is effected to change the table in the reverse direction. Each time the table is changed, the display on the screen is changed. Thus, it is understood that the screen images shown in FIGS. 2A, 2B and 2C are not prepared by changing a portion of the screen as in cursor movement, but are prepared by three separate images.

While the first table T1 is opened and when a key 2 in the remote controller is depressed, track 15 is accessed to play the "second song". After the "second song" is completed, the program returns to the menu before the song is played. Starting again from table T1, when the play key K1 is depressed, the default data is selected to access to track 10 so that the "first song" is played.

Referring particularly to FIG. 4, in step 1, the controller 31 reads the reproduction control data previously recorded on the disk 33 by means of disk reproduction means 32, and stores the reproduced data.

In step 2, the controller 31 provides the address information m1, m2 or m3 of the menu frame for the stored reproduction control data to the disk reproduction means 32, and thereby reproduces the menu frame (FIG. 2A, 2B or 2C) stored on the disk 33 to display the same on the reproduction display means 35.

In step 3, the controller 31 receives key value n from the key input means 34.

In step 4, the controller 31 detects the depressed key which is any one of the ten keys, play key K1 and next key K2.

When the depressed key is the next key K2, the procedure jumps to step 8. Although it is not shown in FIG. 4, a procedures for moving to previous branch table may be provided in association with a previous key K3.

When the depressed key is the play key K1, the procedure goes to step 6. The controller 31 in step 6 references the stored reproduction control data (default data) to obtain the corresponding track number p. In this case, number p is equal to the default data.

When the depressed key is a ten key representing a value n, the procedure goes to step 5: the controller 31 references the stored reproduction control data to determine whether identifier n is defined. If the identification number n is undefined, the procedure loops back to step 2. If the identification number n is defined, the controller 31 in step 6 references the stored reproduction control data to obtain the corresponding track number p. In this case, number p is equal to the track data assigned to the corresponding ten key.

At step 7, the controller 31 reproduces track p from disk 33 using the disk reproduction means 32, and loops back to step 2 when track p reproduction is completed.

To display the next group of selection branches, the controller 31 uses the data from the next branch table contained in the stored reproduction control data (step 8), and loops back to step 2.

As a result, the corresponding track is reproduced when a selection branch displayed on the menu is selected and confirmed. When none of the menu choices is selected, however, the next group of candidate selection branches is displayed by retrieving and displaying the next menu m1, m2, m3, ... mx available. When the user makes a selection by directly entering a numeric key, the track corresponding to the value of that key is reproduced.

By thus providing the reproduction control data required by the second control method with the reproduction control data required by the first selection control method, the reproduction control data can be structured to be usable by both the first and second control method, and both control methods can coexist on the same recording medium.

Here, the first control method is the method in which the track access is accomplished by depressing one of the ten keys to which particular track numbers are assigned. The second control method is the method in which the track access is accomplished by depressing the default key.

By thus providing a first control method for displaying in a single frame plural selection branches to each of which has been added a numerical identification number, and controlling operation by means of branch tables grouping branch data according to the number of the selection branch selected by the user; a second control method for visually differentiating the user-specified selection branch and the other selection branches as a means of prompting user confirmation of the specified selection branch when the plural selection branches are displayed in a single frame, and controlling operation by means of the branch data of the confirmed selection when the user confirms the prompt; and providing in the branch table used by the first control method the branch data used by the second control method as described hereinabove, the selection control method of the present invention groups the branch data usable by both the first control method and the second control method, and can thereby freely combine and use the two selection control methods. As a result, changes in the selection control method, including specifications changes during the disk production process, are made easier, and disks having two coexisting selection control methods can be easily produced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An access control method for controlling an access to a particular address on a disk using a control key device having numerical keys and at least one play key, said method comprising the steps of:

(a) recording a plurality of branch tables and menu frames onto a disk together with information to be reproduced beforehand, each of said plurality of branch tables including address information indicative of a location on the disk at which a corresponding menu frame for displaying selection branches is stored, a correspondence table between identification numbers of selection branches and corresponding addresses included on the disk to be accessed; and each of said menu frames including a plurality of selection branches with identification numbers among which a particular one of said plurality of selection branches corresponding to each menu frame has been visually differentiated from other selection branches;

(b) when the disk is loaded into a disk reproducing apparatus, reading one of said plurality of branch tables recorded on the disk and one of said menu frames corresponding to said one branch table using said address information of said one branch table;

(c) displaying said one menu frame on a display of said disk reproducing apparatus;

(d) selectively performing one of two operations to select a desired selection branch:

(i) operating said play key to select said particular one of said plurality of selection branches having been visually differentiated; and (ii) operating a numerical key corresponding to the identification number of said desired selection branch; and (e) accessing the disk to an address assigned to said desired selection branch with reference to said correspondence table of said branch table.

2. The access control method as claimed in claim 1,
wherein each of said plurality of branch tables further includes address information indicative of a location on the disk at which said particular one of said plurality of selection branches is stored, and when said play key is operated, the address of said particular one of said plurality of selection branches is directly accessed with reference of said address information.

3. The access control method as claimed in claims 1 or 2,
wherein each of said plurality of branch tables further includes an offset value defining a linkage between one branch table and the next branch table, and when none of the selection branches on the displayed menu frame is selected, the next menu frame is read and displayed with reference to said offset value.

4. A disk reproducing apparatus for accessing to a particular address on a disk and reproducing information recorded from said particular address, comprising:

(a) a control key device having numerical keys and at least one play key;

(b) reading means for reading information recorded on the disk, said information including a plurality of branch tables and menu frames, wherein each branch table includes address information indicative of a location on the disk at which a corresponding menu frame for displaying selection branches is stored and a correspondence table between identification numbers of selection branches and corresponding addresses indicative of each address on the disk to be accessed, and wherein each menu frame includes a plurality of selection branches with identification numbers among which a particular one of said plurality of selection branches corresponding to each menu frame has been visually differentiated from other selection branches;

(c) a display for displaying one menu frame with reference to the address information of one branch frame; and (d) a control means for controlling the access to a particular address of a desired selection branch, when selected, with reference to said correspondence table of said branch table, said desired selection branch being selected by selectively performing one of two operations, (i) operating said play key to select said particular one of said plurality of selection branches having been visually differentiated, and (ii) operating a numerical key corresponding to the identification number of said desired selection branch.

* * * * *